(12) United States Patent
Jegoulev et al.

(10) Patent No.: US 8,352,921 B2
(45) Date of Patent: Jan. 8, 2013

(54) STATIC ANALYSIS DEFECT DETECTION IN THE PRESENCE OF VIRTUAL FUNCTION CALLS

(75) Inventors: Kirill Jegoulev, Nepean (CA); Igor Ivanov, Nepean (CA); Artem Frolov, Ottawa (CA)

(73) Assignee: Klocwork Corp., Ottawa (CA)

( * ) Notice: Subject to any disclaimer, the term of this patent is extended or adjusted under 35 U.S.C. 154(b) by 1012 days.

(21) Appl. No.: 12/263,417

(22) Filed: Oct. 31, 2008

(65) Prior Publication Data

US 2009/0119649 A1 May 7, 2009

Related U.S. Application Data

(60) Provisional application No. 60/984,994, filed on Nov. 2, 2007.

(51) Int. Cl.
*G06F 9/44* (2006.01)
*G06F 9/45* (2006.01)
(52) U.S. Cl. .................. 717/131; 717/128; 717/129
(58) Field of Classification Search ........... 717/124–133
See application file for complete search history.

(56) References Cited

U.S. PATENT DOCUMENTS

| | | | | |
|---|---|---|---|---|
| 5,590,330 A | * | 12/1996 | Coskun et al. | 717/126 |
| 5,778,230 A | * | 7/1998 | Wimble et al. | 717/131 |
| 5,812,850 A | * | 9/1998 | Wimble | 717/131 |
| 5,822,589 A | | 10/1998 | Diamant | |
| 6,226,789 B1 | * | 5/2001 | Tye et al. | 717/138 |
| 6,263,489 B1 | * | 7/2001 | Olsen et al. | 717/129 |
| 6,802,054 B2 | * | 10/2004 | Faraj | 717/128 |
| 6,836,884 B1 | * | 12/2004 | Evans et al. | 717/140 |
| 6,957,422 B2 | * | 10/2005 | Hunt | 717/130 |
| 7,055,136 B2 | * | 5/2006 | Dzoba et al. | 717/125 |
| 7,496,903 B2 | * | 2/2009 | Rees et al. | 717/130 |
| 7,669,187 B2 | * | 2/2010 | Liu et al. | 717/124 |
| 7,870,540 B2 | * | 1/2011 | Zare et al. | 717/126 |
| 7,877,642 B2 | * | 1/2011 | Ding et al. | 717/133 |
| 7,900,201 B1 | * | 3/2011 | Qureshi et al. | 717/174 |
| 7,954,090 B1 | * | 5/2011 | Qureshi et al. | 717/127 |
| 7,984,429 B2 | * | 7/2011 | Hunt | 717/130 |
| 8,001,527 B1 | * | 8/2011 | Qureshi et al. | 717/120 |
| 8,042,179 B2 | * | 10/2011 | Shoji et al. | 726/22 |

OTHER PUBLICATIONS

Dimitrov et al, "Unified architectural support for soft error protection or software bug detection", IEEE, pp. 73-82, 2007.*

(Continued)

*Primary Examiner* — Anil Khatri
(74) *Attorney, Agent, or Firm* — Christensen O'Connor Johnson Kindness PLLC

(57) ABSTRACT

A computer-implemented error detection mechanism for detecting programming errors in a computer program. The computer-implemented error detection method described herein can make use of a Function Behavior Knowledge Base (FBKB) to approximate how a virtual function changes state of the program execution for all methods that can be called at each specific invocation point. The FBKB is used to select what implementation of a virtual function should be called in order to give rise to a programming defect. By dropping implementations that do not lead to a programming defect, the set of possible object runtime types is reduced. If this set is empty by the end of the analysis, then a defect is not possible, otherwise the set of object runtime types will contain types that may cause a defect.

20 Claims, 3 Drawing Sheets

OTHER PUBLICATIONS

Daniel et al, "ReAssert: sugessting repairs for broken unit tests" IEEE, pp. 433-444, 2009.*

Tamrawi et al, "Build code analysis with symbolic evaluation", IEEE, pp. 650-660, 2012.*

Mizuno et al, "Traiing on errors experiments to detect fault prone software modules by spam filter", ACM ESEC, pp. 405-414, 2007.*

"List of Tools for Static Code Analysis," <http://en.wikipedia.org/wiki/List_of_tools_for_static_code_analysis> [retrieved Feb. 5, 2009], 4 pages.

"Static Code Analysis," <http://en.wikipedia.org/wiki/Static_code_analysis> [retrieved Feb. 5, 2009], 2 pages.

* cited by examiner

STATIC ANALYSIS DEFECT DETECTION IN THE PRESENCE OF VIRTUAL FUNCTION CALLS

CROSS-REFERENCE TO RELATED APPLICATIONS

The present patent application claims the benefit of U.S. Provisional Patent Application Ser. No. 60/984,994 filed on Nov. 2, 2007, the entire contents of which are incorporated herein by reference.

FIELD OF THE INVENTION

The present invention relates to a method for the detection of errors in computer program code.

BACKGROUND

One of the known computer programming error detection methods is referred to as "static analysis" since computer instructions making up computer program code are analyzed outside the context of the behaviour resulting from the execution of those instructions.

In many cases, source code static analysis tools perform inter-procedural dataflow analysis to detect programming errors in a computer program. To do so, such static analysis tools need to analyze functions which are called at one or more points in a computer program. Source code is the category of computer language instructions that is frequently written and read by software programmers. However, a computer cannot generally run a program in source code form. Typically, in order to be executed by a computer processor, source code is translated, with the use of an assembler or compiler, into a language form that contains instructions to the computer known as object code.

In an object oriented programming language (OOP), a virtual function is a function whose behaviour varies depending on the object runtime type. While some functions are non-virtual and thus the dataflow can easily be traced, the use of virtual functions can potentially make dataflow analysis difficult to track because it is unknown at the compile time which implementation of a virtual function (also known as a virtual method) will be called and how the state of the computer program will be transformed after the call.

Source code static analysis tools generally do not consider the behaviour of a virtual function once it has been called. Instead, such tools generally only verify whether the syntax of the call to the virtual function meets the requirements of the computer language of the computer program code under review. As a result, when virtual functions are used in computer program code, it can be difficult for a static analysis tool to perform a correct or precise analysis. Some tools process virtual function calls when it is possible to identify at the compile time that although the function is virtual, only one implementation could be used. Well known methods like Static Class Hierarchy Analysis or Rapid Type Analysis could be used for that purpose.

SUMMARY OF THE INVENTION

Static analysis is limited to what can be determined without considering the dynamic effects of program execution. Accordingly, some embodiments of the present invention may provide a computer-implemented method for detecting errors in a computer program which considers the different state changes of a virtual function during execution.

In accordance with the computer-implemented method described herein, a Function Behaviour Knowledge Base (FBKB) is used to select what implementation of a virtual function should be called in order to give rise to a programming defect. A FBKB is a set of records containing information about function behaviour. By dropping implementations that do not lead to a programming defect, the set of possible object runtime types is reduced. If this set is empty by the end of the analysis, then a defect is not possible, otherwise the set of object runtime types will contain types that may cause a defect.

According to one broad aspect of the present invention, there is provided a computer-implemented method for detecting errors in computer program code, comprising: identifying one or more virtual function calls in the computer program code; conducting an error detection analysis of the computer program code based on implementations of the one or more virtual functions.

In some embodiments, conducting an error detection analysis of the computer program code comprises: for each object instance in the computer program code that includes one or more virtual function calls, determining at least one possible runtime type (PRTT) for each object instance.

In some embodiments, conducting an error detection analysis of the computer program code further comprises: for each object instance in the computer program code that includes one or more virtual function calls, identifying possible runtime types among the at least one possible runtime type that may result in one or more expected error events.

In some embodiments, the method further comprises: removing those runtime types, among the at least one possible runtime type, that do not result in at least one of the one or more expected error events.

In some embodiments, if none of the at least one possible runtime types results in at least one of the one or more expected error events for a current virtual function call of the one or more virtual function calls under analysis, analysis of the current virtual function call is stopped.

In some embodiments, removing those runtime types, among the at least one possible runtime type, that do not result in at least one of the one or more expected error events comprises: checking a Function Behaviour Knowledge Base (FBKB) to identify implementations of the virtual function that do not result in at least one of the one or more expected events.

In some embodiments, removing those possible runtime types, among the at least one possible runtime type, that do not result in at least one of the one or more expected events comprises: checking a FBKB to identify implementations of the virtual function that produce an expected error invalidation event G or an expected error invalidation event sequence $G_1, G_2, G_3, \ldots G_N$.

In some embodiments, the computer program code is computer program source code.

In some embodiments, the method further comprises storing knowledge data concerning virtual functions of the computer program code and knowledge concerning behaviors thereof in a Functional Behaviour Knowledge Base (FBKB).

In some embodiments, the method further comprises: reporting any errors in said computer program code.

According to another broad aspect of the present invention, there is provided a system for detecting errors in computer program code, comprising: computer processing means for identifying one or more virtual function calls in the computer program code; computer processing means for conducting an error detection analysis of the computer program code based on implementations of the one or more virtual functions.

In some embodiments, the computer processing means for conducting an error detection analysis of the computer program code comprises: computer processing means that for each object instance in the computer program code that includes one or more virtual function calls, determines at least one possible runtime type (PRTT) for each object instance.

In some embodiments, the computer program means for conducting an error detection analysis of the computer program code further comprises: computer program means that for each object instance in the computer program code that includes one or more virtual function calls, identifies possible runtime types among the at least one possible runtime type that may result in one or more expected error events.

In some embodiments, the system further comprises: computer program means for removing from consideration those possible runtime types among the at least one possible runtime type that do not result in at least one of the one or more expected error events.

In some embodiments, if none of the at least one possible runtime types results in at least one of the one or more expected error events for a current virtual function call of the one or more virtual function calls under analysis, the system stops analysis of the current virtual function call.

In some embodiments, the computer program means for removing from consideration those possible runtime types among the at least one possible runtime type that do not result in at least one of the one or more expected error events comprises: computer program means for checking a Function Behaviour Knowledge Base (FBKB) to identify implementations of the virtual function that do not that do not result in at least one of the one or more expected error events.

In some embodiments, the computer program means for removing from consideration those possible runtime types among the at least one possible runtime type that do not result in at least one of the one or more expected error events comprises: computer program means for checking a FBKB to identify implementations of the virtual function that produce an expected error invalidation event G or an expected error invalidation event sequence $G_1, G_2, G_3, \ldots G_N$.

In some embodiments, the system further comprises computer program means for storing knowledge data concerning virtual functions of the computer program code and knowledge concerning behaviours thereof in an FBKB.

In some embodiments, the system further comprises: computer program means for reporting any errors in said computer program code.

Other embodiments of the invention provide computer readable media having computer executable instructions stored thereon for execution by one or more computers, that when executed implement a method as detailed below.

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying diagrams, in which.

DETAILED DESCRIPTION

Figure 1:
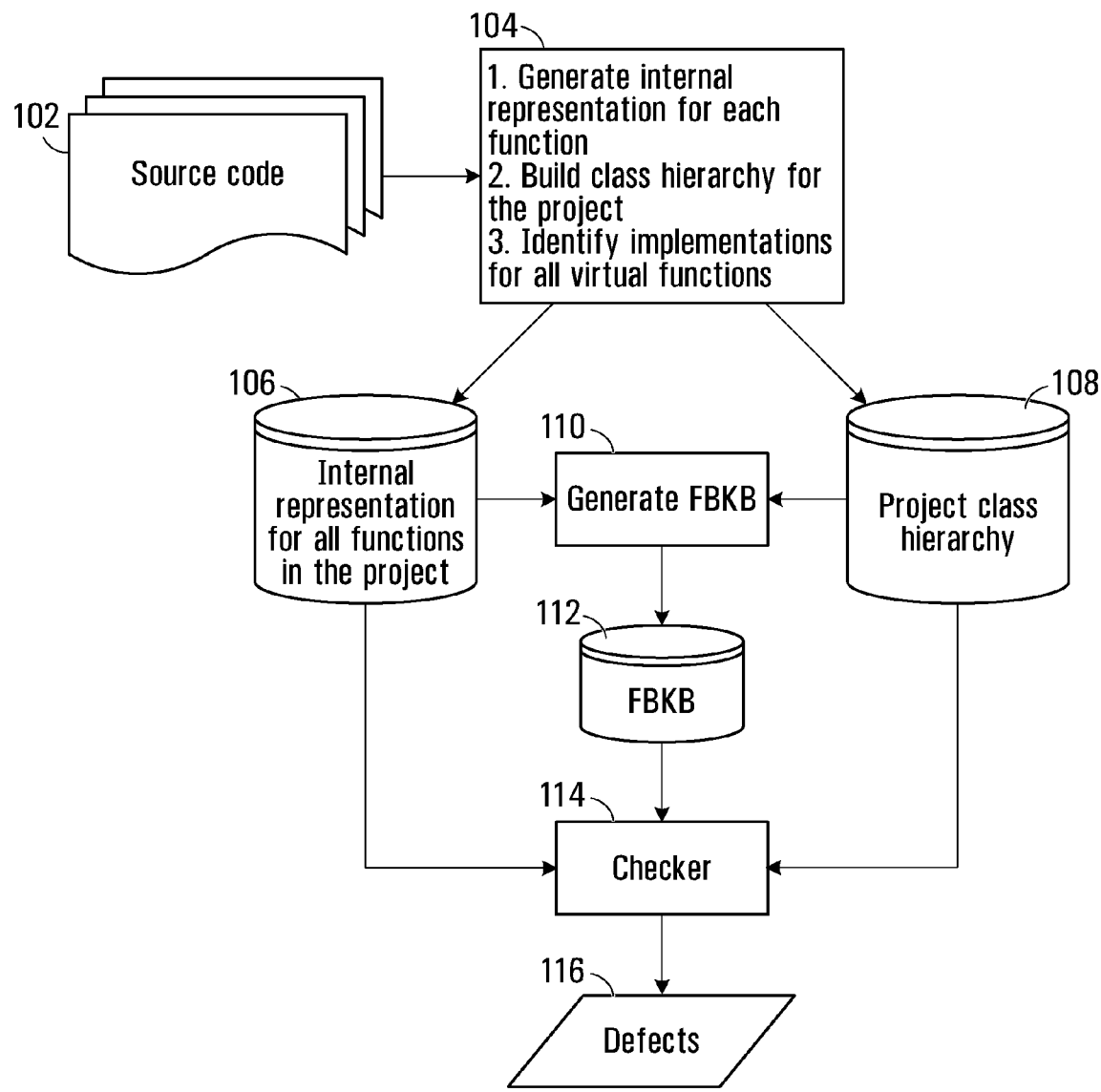
FIG. 1 is a flow diagram for a tool embodying the computer-implemented error detection method described herein.

In the area of defect detection, static dataflow analysis is used to find certain patterns in computer program code that may cause runtime errors or unexpected behaviour or even security vulnerabilities. Such patterns may cause, for example, buffer overflow, null pointer dereference, resource leaks and other problems during program execution. Identifying such patterns may involve performing inter-procedural analysis. Object-oriented computer languages, such as C++ and Java, often use special mechanisms called virtual function calls. This mechanism allows calling different functions depending on the object runtime type. At compile time, it is generally impossible to identify what exact function will be called, as the object runtime type at the time of execution is generally unknown at compile time.

Example code containing a virtual function is set out below by way of example only, and should not be considered as limiting in any way. In this case, a base class B includes a virtual function foo. Subclasses D1 and D2 are defined in terms of class B but would implement foo differently depending on the behaviour of D1 and D2.

```
1   class B{
2     public:
3       virtual void foo(int *p) = 0;
4   };
5
6   class D1 : public B{
7     public:
8       void foo(int *p);
9   };
10
11  class D2 : public B{
12    public:
13      void foo(int *p);
14  };
15
16  void foo(B *pb, int *p){
17    pb->foo(p); // may call either D1::foo( ) or D2::foo( )
18  }
```

In the area of code optimization, the problems associated with performing interprocedural data flow analysis on virtual functions are addressed only in the case when a source code static analysis tool is able to identify that only one implementation of a virtual function can be used at a certain place in the program code being analyzed. As described in the prior art, different approaches can be used in order to ensure virtual functions call only one function no matter how the program is executed. For example, an indirect call can be replaced with a direct call.

The present approach allows inter-procedural dataflow analysis to be performed even if a virtual function call may call several different instances of different classes.

The computer-implemented error detection method described herein makes use of a FBKB (Function Behaviour Knowledge Base) to approximate how a virtual function changes the state of the program execution for all methods that can be called at each specific invocation point.

To illustrate how function behavior information can be used for inter-procedural dataflow analysis, the following specific example is provided. This specific implementation is provided by way of example only for illustrative purposes, and should not be considered as limiting.

Suppose there is a need to implement a method that will detect when data received from a function Source( ) will be passed to function Sink( ). A method iM tracks data within one function (an intra-procedural method). To develop a method that will solve the problem across function calls (inter-procedurally), function behavior information is used to describe behavioral information for any function. For this example FBKB will store three kinds of records: fbkb-sources, fbkb-sinks, fbkb-propagators. In the following example, function input denotes everything that is passed to a function through function arguments and global data, including data that is pointed to by function arguments and global data, and function output denotes everything that is accessible from the function and is accessible after the function returns, including function return values, global variables, and data accessible through pointers changed by function.

If an analyzed function $f( )$ calls a function snk( ) and there is an fbkb-sink record for snk( ) and method iM identifies that income of the function $f( )$ may be passed to the function snk( ), then function $f( )$ with its income is stored as an fbkb-sink. Original function Sink( ) is saved as fbkb-source before analysis starts.

If the analyzed function $f( )$ calls a function src( ) and there is an fbkb-source record for src( ) and method iM identifies that the output of the function src( ) may become an output of function $f( )$, then function $f( )$ with its output is stored as an fbkb-source. Original function Source( ) is saved as fbkb-source before analysis starts.

If method iM identifies that analyzed function $f( )$ passes its input to its output, then function $f( )$ and information about its input and output is saved as a record in the FBKB indicating that $f( )$ is an fbkb-propagator. Method iM uses these fbkb-propagator records to track data within other analyzed functions afterwards. If method iM finds that analyzed function $f( )$ passes data from the function with a fbkb-source record to function with a fbkb-sink record, then data flow from Source( ) to Sink( ) through the chain of calls has been detected.

The FBKB is not limited to the kinds of records described above and may be used to solve other problems as well. For example if the purpose of a method is to calculate possible values of expressions in a program, then the FBKB may store possible return values for each function.

Essentially, a FBKB is a set of records that describe computer program state transformation for each function defined in the program. Often, properties that are relevant to one kind of defect are irrelevant to another. Therefore in order to find defects, intra-procedural analysis may scan function implementations and find program transformations that are relevant to those defects. The result of that scan is saved into the FBKB. When a checker is run and it approaches a function call, records saved in the FBKB are checked for the called function to see if an expected transformation is done.

For example, a record that is relevant to null pointer dereference checker is "function $f( )$ dereferences its first argument". When checker 114 finds a call to function $f( )$ and if it knows that NULL may be passed to the function, instead of switching context and analyzing what is happening to that value, it may just check the FBKB, find the required record, i.e., "function $f( )$ dereferences it's first argument", and reports a defect.

Further information regarding a FBKB is disclosed in U.S. Provisional Patent Application No. 60/984,987 entitled "Software Analysis System and Method", filed on Nov. 2, 2007, the entire disclosure of which is hereby incorporated by reference.

FIG. 1 is a flow diagram 100 for a software tool embodying the computer-implemented error detection method described herein. During an initial phase of operation, source code 102 (the source code for the computer program code under review) is provided to compiler base tools 104 to extract all necessary information from source code 102. To accomplish this task, compiler base tools 104 may perform the following tasks:

104.1 Generate internal representation for each function in the source code. This step includes identifying which functions are virtual, and which functions are non-virtual;

104.2 Build a class hierarchy for the computer program code under review (i.e. a "project"). This includes assessing function call ordering and building an inheritance graph of the computer program code under review; and 104.3 Identify implementations for virtual functions.

The internal representations for all functions in the project may be stored in database 106. The project class hierarchy may be stored in database 108.

The internal representations for all functions in the project stored in database 106 may then be used to generate the FBKB at step 110, which may then be stored in FBKB database 112. During an error checking phase, the project class hierarchy database 108, together with FBKB 112 and the internal representations for all functions in the project may be stored in database 106 are may then be used as inputs for error checker 114. The output of error checker 114 are defects 116 found in source code 102. What may also be provided is a reporting element for reporting the error information to the user.

Figure 2:
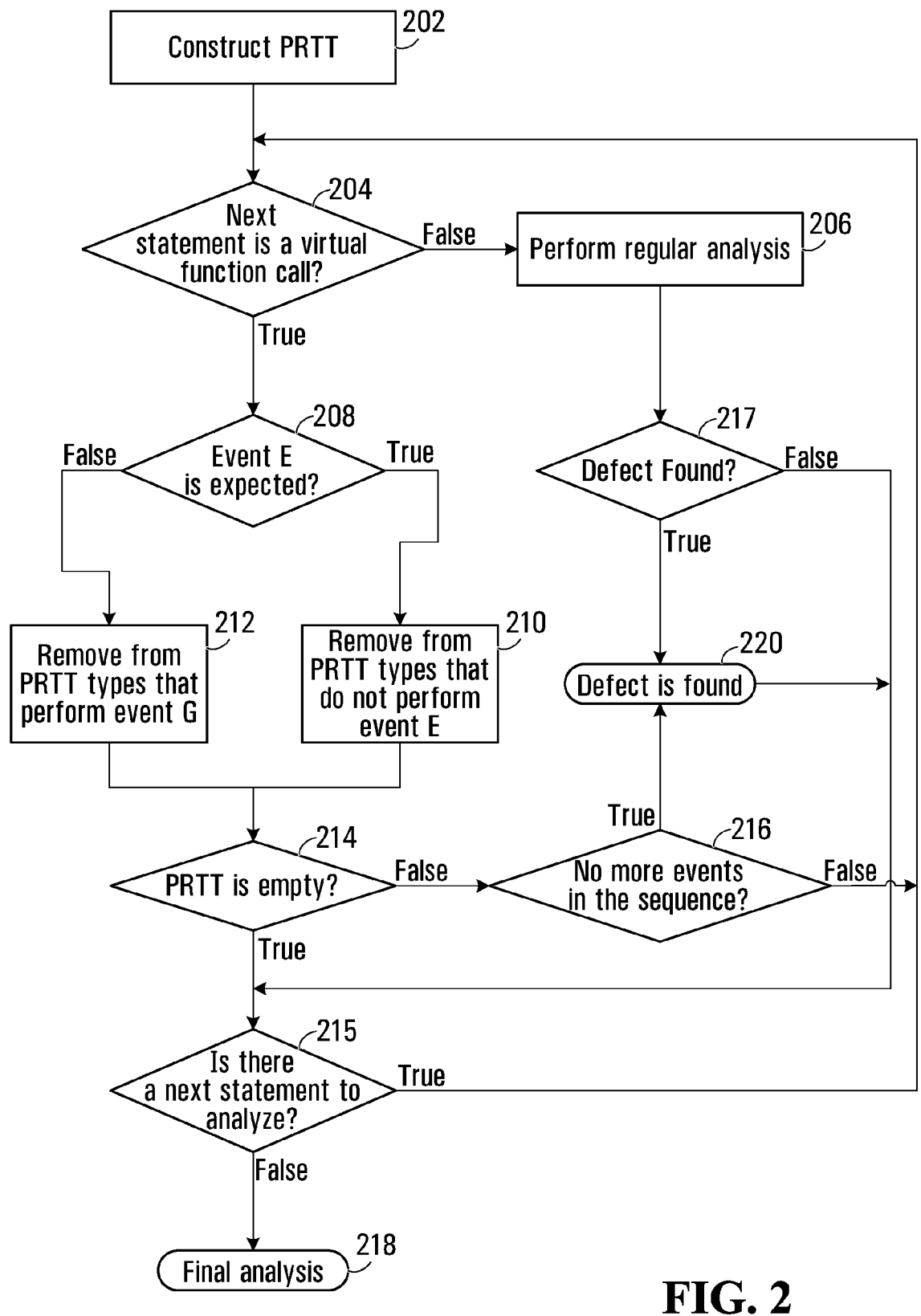
FIG. 2 is a flowchart of steps performed by an error checker as described herein to detect errors in computer program code.

The operation of error checker 114 is described in more detail below in connection with FIG. 2. FIG. 2 is a flowchart of steps performed by error checker 114 according to the computer-implemented method described herein.

For the purpose of this embodiment, it is assumed that a defect pattern known to error checker 114 contains event sequence $E_1, E_2, E_3, \ldots E_N$ and that error checker 114 locates usage of this pattern in source code 102. For example, a memory leak pattern may have the following events: $E_1$=memory is allocated, and $E_2$=all references to the memory are out of scope or were reassigned a new value.

It is also assumed for the purpose of this embodiment that an event sequence $G_1, G_2, G_3, \ldots G_N$ may invalidate a defect. For example, $E_1$ and $E_2$ may be invalidated if $G_1$=memory is released after memory allocation event and before all references to memory were lost.

An embodiment of the computer implemented method described herein will now be described with reference to FIG. 2. The computer implemented method tracks a set of possible runtime types that each object "o" in a piece of source code may have. This set will be referred to as Possible Run-Time Type PRTT(o). With reference to FIG. 2, PRTT(o) may be initially constructed at step 202 using different approaches known in the art such as Static Class Hierarchy Analysis (SCA) or Alias Analysis or Rapid Type Analysis. These approaches provide for the creation of call graphs for object-oriented computer programming languages, and is the basis for many optimization algorithms in compilers and tools for object-oriented languages like Java and C++. PRTT(o) may be used to identify virtual functions implementations that may be called at the place of a virtual function call in a piece of source code.

It is noted that PRTT(o) may be used to find all implementations of a virtual function that could be called at some particular place in the program in the context of the performed analysis. FBKB records for these implementations are used for analysis purposes.

At step 204, an error checker, such as the error checker 114 illustrated in FIG. 1, determines whether the next statement in a piece of source code, such as source code 102 in FIG. 1, is a virtual function call. If no, in step 206 error checker 114 performs regular static analysis using methods known in the art.

In the illustrated embodiment, it is determined at step 217 whether or not a defect was found by the regular static analysis performed in step 206. If a defect was found in step 206, the defect is noted in step 220 and the method proceeds to step 215, in which it is determined whether or not there is another statement to be analyzed.

If it is determined in step 215 that there is another statement to be analyzed, the method returns to step 204, in which it is determined if the next statement is a virtual function call, as described above. If it is determined in step 215 that there are no further statements to be analyzed, final analysis of the results of the method is made in step 218.

If it is determined in step 204 that the next statement is a virtual function call, error checker 114 determines at step 208 whether event E is expected. If error checker 114 expects event E at the place of the virtual function call of the statement identified in step 204, PRTT(o) may be used in order to find all possible virtual function implementations that can be called at that specific invocation point. Next an FBKB, such as FBKB 112 in FIG. 1, is checked to identify virtual function implementations that do not produce event E (step not shown). Runtime types that use those implementations are removed from PRTT(o) at step 210. If FBKB identifies that some virtual function implementations that can be called produce event G, then runtime types that use those implementations are removed from PRTT(o) at step 212.

At step 214, error checker 114 determines whether PRTT is empty. If yes, the analysis of the virtual function under review is finished and it is determined in step 215 whether or not there is another statement to be analyzed, as described above.

If error checker 114 determines at step 214 that PRTT is not empty, error checker 114 then determines at step 216 whether there are any more events in the sequence. If no, then regular analysis continues at step 204. If yes, then a defect is found at step 220 and the method proceeds to step 215.

The computer-implemented method described herein may use a FBKB as a tool to merge information about the behaviour of several implementations of the same virtual function, which can potentially increase the accuracy of the analysis. The method may allow inter-procedural analysis to be performed even if there are several implementations of virtual functions that may be called in a call statement. In the end result, the method may calculate runtime types that cause a defect.

Through use of the above described computer-implemented method, a static analysis can be performed on computer program code embodying one or more virtual functions.

Figure 3:
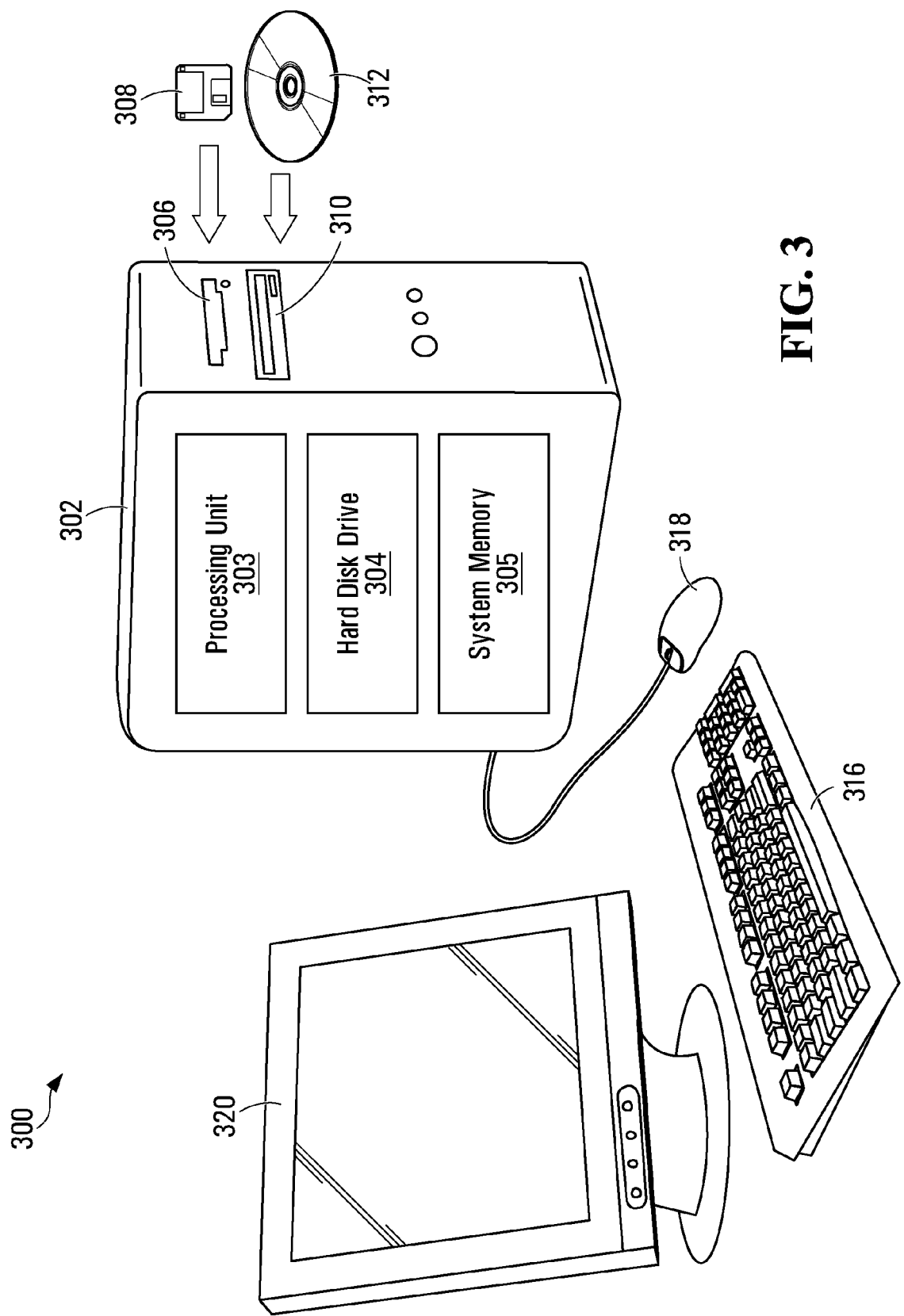
FIG. 3 is a schematic diagram of a conventional data processing system on which the computer-implemented methods described herein can be implemented.

As shown in FIG. 3, an exemplary data processing system 300 for implementing the invention includes a general purpose computing device 302 in the form of a conventional personal computer or the like, including a processing unit 303, and a system memory 305. The personal computer 302 may further include a hard disk drive 304, a magnetic disk drive 306 for reading from or writing to a removable magnetic disk 308, and an optical disk drive 310 for reading from or writing to a removable optical disk 312 such as a CD-ROM or other optical media. Not shown is a central processing unit (CPU). The drives and their associated computer-readable media provide non-volatile storage of computer readable instructions, data structures, program modules and other data which can be used to store the desired information and which can be accessed by the computing device 302. Other types of computer readable media which can store data that is accessible by a computer can also be used.

Computing device 302 includes an operating system, one or more application programs, other program modules and program data.

A user may enter commands and information into the personal computer through input devices such as a keyboard 316 or a pointing device 318. A monitor 320 or other type of display device is also connected to personal computer 302. Personal computer 302 may operate in a networked environment using logical connections to one or more remote computers.

The computer program to be analyzed may be stored on hard disk drive 404 or may be located remote from computing device 302 on a website accessible via the Internet. A computer program represents a series of instructions carried out by a computer.

A user can use computer software running on personal computer 302 to utilize the computer-implemented methods described above. However, the processing platform may be any general purpose processing platform capable of running software implementing the computer-implemented error checking method described herein, for example a mainframe to name one example.

What has been described is merely illustrative of the application of the principles of the invention. Other arrangements and methods can be implemented by those skilled in the art without departing from the spirit and scope of the present invention.

The invention claimed is:

1. A computer-implemented method for static analysis of computer program code to detect errors in the computer program code, comprising:
performing a static analysis of the computer program code without execution of the computer program code;
identifying, without execution of the computer program code, one or more virtual function calls in the computer program code; and
conducting, without execution of the computer program code, an error detection analysis of the computer program code based on implementations of the one or more virtual functions, wherein conducting, without execution of the computer program code, the error detection analysis of the computer program code comprises:
for an object instance in the computer program code that includes one or more virtual function calls, determining, without execution of the computer program code, at least one possible runtime type (PRTT) for the object instance.

2. The method of claim 1 wherein determining, without execution of the computer program code, at least one possible runtime type (PRTT) for the object instance is performed for each object instance in the computer program code that includes one or more virtual function calls.

3. The method of claim 2, wherein conducting an error detection analysis of the computer program code further comprises:
for each object instance in the computer program code that includes one or more virtual function calls, identifying, without execution of the computer program code, possible runtime types among the at least one possible runtime type that may result in one or more expected error events.

4. The method of claim 3, further comprising:
removing those runtime types, among the at least one possible runtime type, that do not result in at least one of the one or more expected error events.

5. The method of claim 4 wherein if none of the at least one possible runtime types results in at least one of the one or more expected error events for a current virtual function call of the one or more virtual function calls under analysis, analysis of the current virtual function call is stopped.

6. The method of claim 4, wherein removing those runtime types, among the at least one possible runtime type, that do not result in at least one of the one or more expected error events comprises:
checking a Function Behaviour Knowledge Base (FBKB) to identify, without execution of the computer program code, implementations of the virtual function that do not result in at least one of the one or more expected events.

7. The method of claim 4, wherein removing those possible runtime types, among the at least one possible runtime type, that do not result in at least one of the one or more expected events comprises:
checking a Function Behaviour Knowledge Base (FBKB) to identify, without execution of the computer program code, implementations of the virtual function that produce an expected error invalidation event G or an expected error invalidation event sequence $G_1$, $G_2$, $G_3$, ... $G_N$.

8. The method of claim 1 wherein the computer program code is computer program source code.

9. The method of claim 1 further comprising storing knowledge data concerning virtual functions of the computer program code and knowledge concerning behaviors thereof in a Functional Behaviour Knowledge Base (FBKB).

10. The method of claim 1 further comprising:
reporting any errors in said computer program code.

11. A computer-readable storage medium for static analysis of computer program code errors in the computer program code, the computer-readable storage medium including instructions for execution by one or more computers that when executed implement a method according to claim 1.

12. A system for static analysis of computer program code to detect errors in the computer program code, comprising one or more processors and one or more computer-readable storage media having stored thereon computer-executable instructions configured to cause the system to:
perform a static analysis of the computer program code without execution of the computer program code;
identify, without execution of the computer program code, one or more virtual function calls in the computer program code based on the static analysis of the computer program code;
conduct, without execution of the computer program code, an error detection analysis of the computer program code based on implementations of the one or more virtual functions,
wherein, for an object instance in the computer program code that includes one or more virtual function calls, the computer-executable instructions are configured to cause the system to determine, without execution of the computer program code, at least one possible runtime type (PRTT) for the object instance.

13. The system of claim 12 wherein the computer-executable instructions configured to cause the system to determine, without execution of the computer program code, at least one possible runtime type (PRTT) for the object instance comprise:
computer-executable instructions that for each object instance in the computer program code that includes one or more virtual function calls, are configured to cause the system to determine, without execution of the computer program code, at least one possible runtime type (PRTT) for each object instance.

14. The system of claim 13, wherein the computer-executable instructions configured to cause the system to conduct, without execution of the computer program code, an error detection analysis of the computer program code further comprise:
computer-executable instructions that for each object instance in the computer program code that includes one or more virtual function calls, are configured to cause the system to identify, without execution of the computer program code, possible runtime types among the at least one possible runtime type that may result in one or more expected error events.

15. The system of claim 14, wherein the computer-executable instructions are further configured to cause the system to:
remove from consideration those possible runtime types among the at least one possible runtime type that do not result in at least one of the one or more expected error events.

16. The system of claim 15 wherein if none of the at least one possible runtime types results in at least one of the one or more expected error events for a current virtual function call of the one or more virtual function calls under analysis, the system stops analysis of the current virtual function call.

17. The system of claim 15, wherein the computer-executable instructions configured to cause the system to remove from consideration those possible runtime types among the at least one possible runtime type that do not result in at least one of the one or more expected error events comprise:
computer-executable instructions configured to cause the system to check a Function Behaviour Knowledge Base (FBKB) to identify, without execution of the computer program code, implementations of the virtual function that do not result in at least one of the one or more expected error events.

18. The system of claim 15, wherein the computer-executable instructions configured to cause the system to remove from consideration those possible runtime types among the at least one possible runtime type that do not result in at least one of the one or more expected error events comprise:
computer-executable instructions configured to cause the system to check a Function Behaviour Knowledge Base (FBKB) to identify, without execution of the computer program code, implementations of the virtual function that produce an expected error invalidation event G or an expected error invalidation event sequence $G_1$, $G_2$, $G_3$, ... $G_N$.

19. The system of claim 12, wherein the computer-executable instructions are further configured to cause the system to store knowledge data concerning virtual functions of the computer program code and knowledge concerning behaviours thereof in Function Behaviour Knowledge Base (FBKB).

20. The system of claim 12, wherein the computer-executable instructions are further configured to cause the system to report any errors in said computer program code.

* * * * *

UNITED STATES PATENT AND TRADEMARK OFFICE
CERTIFICATE OF CORRECTION

PATENT NO. : 8,352,921 B2
APPLICATION NO. : 12/263417
DATED : January 8, 2013
INVENTOR(S) : K. Jegoulev et al.

It is certified that error appears in the above-identified patent and that said Letters Patent is hereby corrected as shown below:

In the Claims

| COLUMN | LINE | ERROR |
|---|---|---|
| 9 | 34 | "Functional Behavior Knowledge Base" should read --Function Behavior Knowledge Base-- |

Signed and Sealed this
Twenty-fourth Day of December, 2013

Margaret A. Focarino
*Commissioner for Patents of the United States Patent and Trademark Office*